(12) United States Patent
Walker

(10) Patent No.: US 8,464,988 B1
(45) Date of Patent: Jun. 18, 2013

(54) KEYBOARD INSTRUMENT STAND WITH CONCAVE SIDES

(76) Inventor: Brock B. Walker, Swansea, IL (US)

( * ) Notice: Subject to any disclaimer, the term of this patent is extended or adjusted under 35 U.S.C. 154(b) by 278 days.

(21) Appl. No.: 13/086,973

(22) Filed: Apr. 14, 2011

(51) Int. Cl.
*A47F 5/00* (2006.01)

(52) U.S. Cl.
USPC ........ 248/122.1; 248/127; 248/918; 248/165; 248/447; 248/460; 108/50.01; 312/281; 211/150; 211/149

(58) Field of Classification Search
USPC ............. 248/130, 136, 135, 147, 434, 165, 248/166, 170, 150, 461, 127, 121, 122.1, 248/125.9, 235, 240, 240.2, 240.4, 447, 460, 248/463, 918; 108/23, 50.01, 50.02, 115, 108/108, 25; 211/150, 149, 195, 133.3, 193, 211/26; 362/127, 133, 134, 217.14, 217.15; 312/281
See application file for complete search history.

(56) References Cited

U.S. PATENT DOCUMENTS

| | | | | | |
|---|---|---|---|---|---|
| 355,733 | A | * | 1/1887 | Umstadter | 211/44 |
| 435,254 | A | * | 8/1890 | Straughan | 312/234 |
| 575,711 | A | * | 1/1897 | Haley | 108/50.13 |
| 747,475 | A | * | 12/1903 | Perky | 126/260 |
| 827,338 | A | * | 7/1906 | Whitlow | 68/122 |
| 989,773 | A | * | 4/1911 | Flockhart | 211/119.011 |
| 1,149,012 | A | * | 8/1915 | Yamasaki | 312/258 |
| 1,261,755 | A | * | 4/1918 | Beyle | 248/125.8 |
| 1,538,198 | A | * | 5/1925 | Manchester | 362/98 |
| 1,621,329 | A | * | 3/1927 | Malone | 211/70.2 |
| 1,682,342 | A | * | 8/1928 | Kraft | 108/23 |
| 1,693,802 | A | * | 12/1928 | Bailey | 108/23 |
| 1,824,813 | A | * | 9/1931 | Friedemann | 108/108 |
| 1,844,698 | A | * | 2/1932 | Snyder | 132/73.5 |
| 1,898,666 | A | * | 2/1933 | Isaacson | 108/6 |
| 1,905,908 | A | * | 4/1933 | Karnes | 108/108 |
| 2,019,581 | A | * | 11/1935 | Probst | 248/447 |
| 2,526,527 | A | * | 10/1950 | Zander | 248/463 |
| 2,971,658 | A | * | 2/1961 | D Altrui | 211/193 |
| 3,230,814 | A | | 1/1966 | Welts | |
| 3,368,786 | A | * | 2/1968 | Bulman | 248/455 |
| 3,794,183 | A | * | 2/1974 | Colbridge | 211/208 |
| 4,042,203 | A | * | 8/1977 | Warkentin | 248/449 |
| 4,360,936 | A | * | 11/1982 | Keller | 5/9.1 |
| 4,378,881 | A | | 4/1983 | de Vries | |
| 4,445,415 | A | | 5/1984 | Izquierdo | |
| 4,488,468 | A | | 12/1984 | Peterson et al. | |
| 4,550,638 | A | | 11/1985 | Kaneko et al. | |
| 4,703,910 | A | * | 11/1987 | Ross | 248/463 |
| 4,770,380 | A | * | 9/1988 | Eason et al. | 248/165 |
| 5,149,905 | A | * | 9/1992 | Count | 84/744 |
| 5,626,379 | A | * | 5/1997 | Scott | 294/143 |
| D388,246 | S | | 12/1997 | Patterson | |
| 5,866,829 | A | | 2/1999 | Pecoraro | |
| 5,906,284 | A | * | 5/1999 | Hammerstrom et al. | 211/205 |
| 6,378,709 | B1 | * | 4/2002 | Stuart | 211/87.01 |
| 6,484,747 | B2 | * | 11/2002 | Bridgers | 137/355.17 |
| 6,736,358 | B2 | * | 5/2004 | Johnson | 248/125.3 |
| 8,033,679 | B1 | * | 10/2011 | Kemmler | 362/125 |
| 8,152,115 | B2 | * | 4/2012 | Blichmann | 248/159 |
| 8,367,919 | B2 | * | 2/2013 | Belitz et al. | 84/453 |
| 2003/0193004 | A1 | * | 10/2003 | Kapp | 248/460 |
| 2008/0135697 | A1 | | 6/2008 | Workman et al. | |

* cited by examiner

*Primary Examiner* — Kimberly Wood

(57) ABSTRACT

The present invention features a keyboard instrument stand having concave sides on the main beam. A set of legs is pivotably attached to the sides of the beam, wherein the beam can stably rest on the extended legs. The unique positioning of the legs provide for many advantages, including reduction in rocking of the stand during a performance.

5 Claims, 3 Drawing Sheets

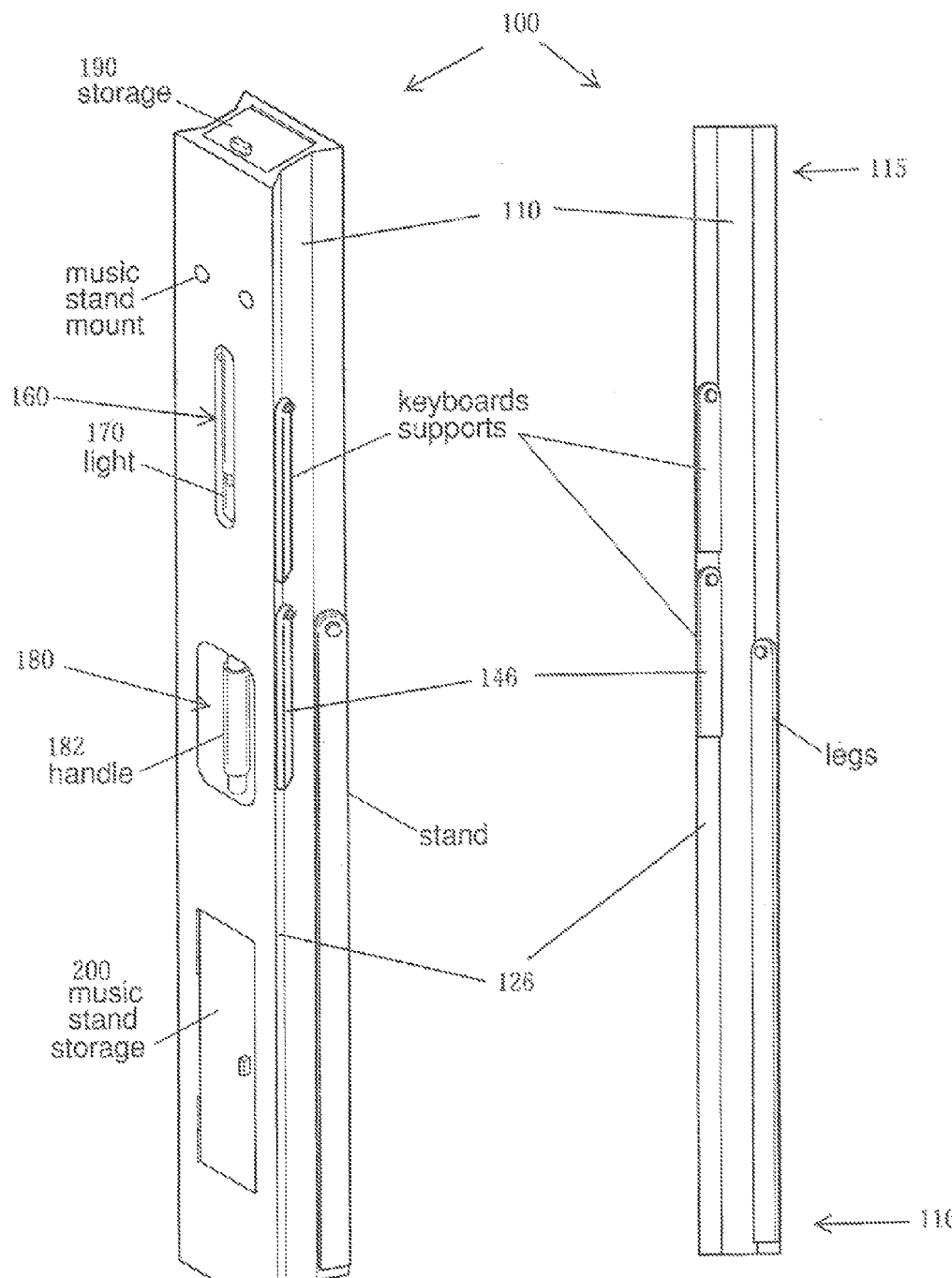
FIG. 1 (ISO View)
FIG. 2 (Side View)

(Top View)

(Top View)

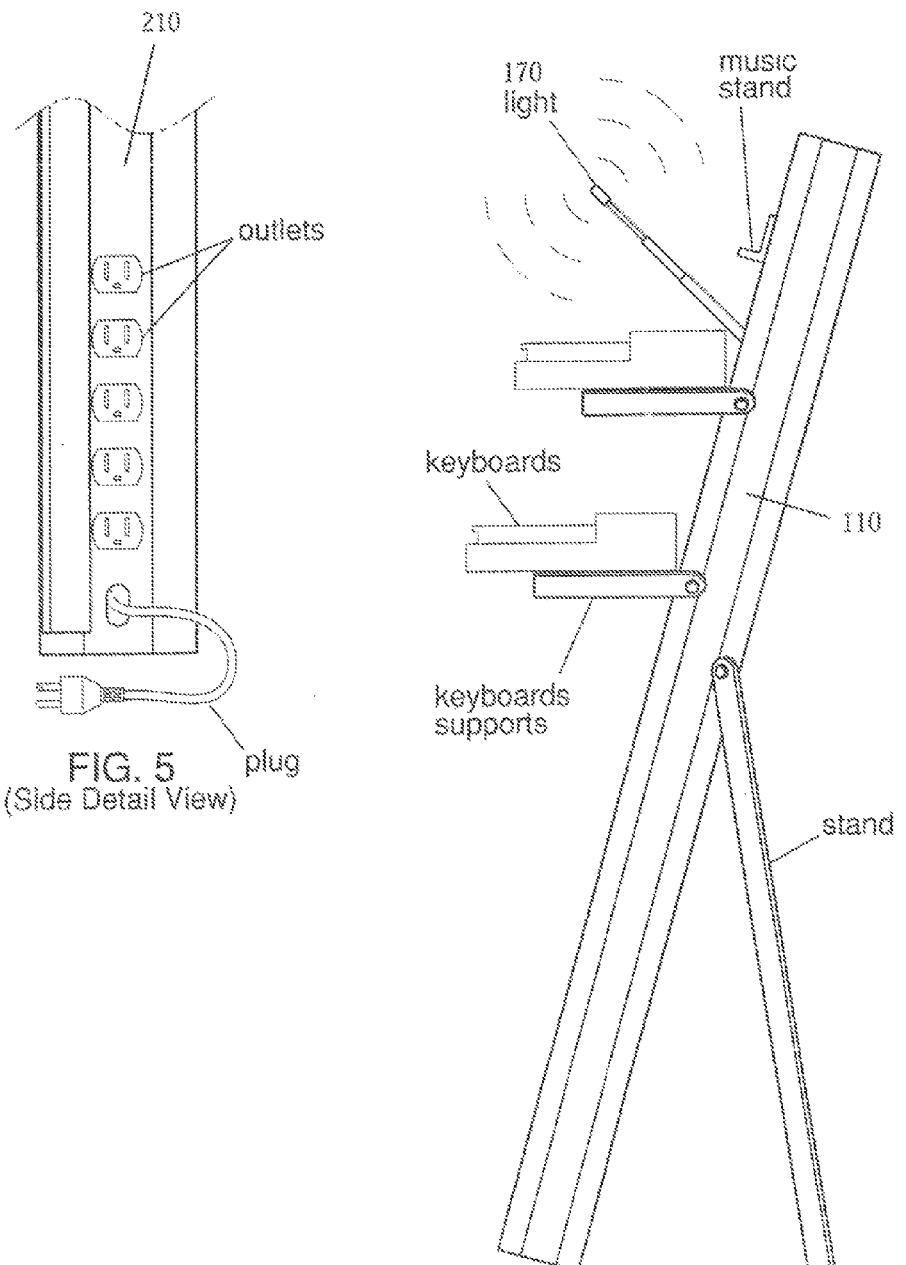

KEYBOARD INSTRUMENT STAND WITH CONCAVE SIDES

BACKGROUND OF THE INVENTION

The present invention features a keyboard instrument stand having concave sides on the main beam. A set of legs are pivotably attached to the sides of the beam, wherein the beam can stably rest on the extended legs. The unique positioning of the legs provide for many advantages, including reduction in rocking of the stand during a performance.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 1 shows an isometric view of the stand with the legs and support arms in their collapsed position.

FIG. 2 shows a side view of the stand.

FIG. 5 shows a power strip or surge protector that can be mounted on the beam.

FIG. 6 shows a side view of the stand, with the legs and support arms in their extended position, wherein the beam leans backward onto the extended legs, and the keyboards resting on the extended support arms.

DESCRIPTION OF PREFERRED EMBODIMENTS

Figure 3:
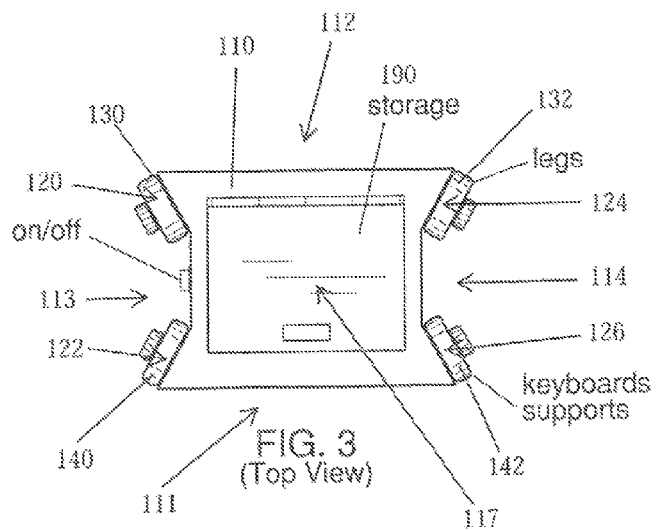
FIG. 3 shows a top view of the stand, wherein the legs and support arms are pivotably attached to the concave sides of the beam. The legs and support arms are in their collapsed position.
Figure 4:
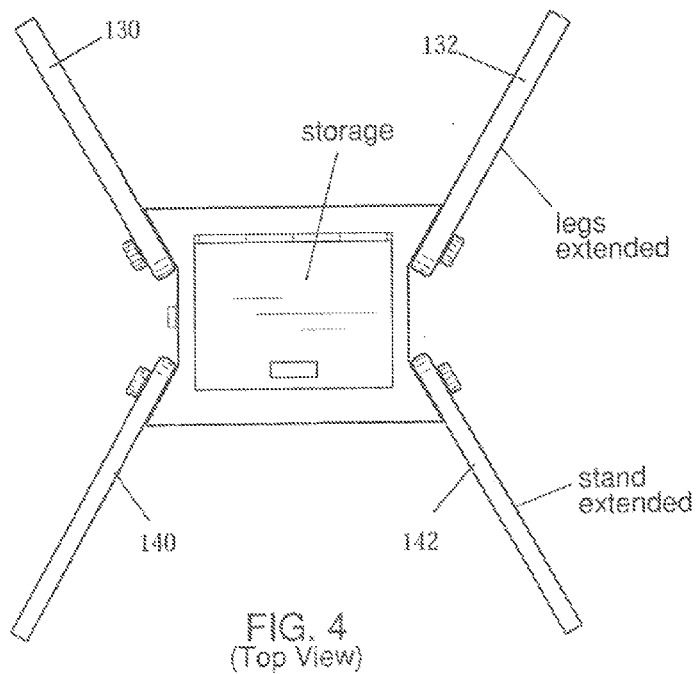
FIG. 4 shows a top view of the stand, wherein the legs and support arms are pivotably attached to the concave sides of the beam. The legs and support arms are in their extended position, wherein the legs form about a 35 to 45 degree with respect to each other, and the support arms form about a 35 to 45 degree with respect to each other.

Referring now to FIGS. 1-6, the present invention features a keyboard instrument stand 100 comprising a beam 110 having a front beam side 111, a back beam side 112, a first beam side 113 and a second beam side 114, a top beam end 115 and a lower beam end 116. In some embodiments, the first beam side 113 is concave toward a center 117 of the beam 110 to form a first wedge surface 120 and a second wedge surface 122. In some embodiments, the second beam side 114 is concave toward the center 117 of the beam to form a third wedge surface 124 and a fourth wedge surface 126.

In some embodiments, the stand 100 further comprises a first leg 130 pivotably attached to the first wedge surface 120, and a second leg 132 pivotably attached to the third wedge surface 124. The first leg 130 and the second leg 132 can be pivotably extended backward and the beam can stably lean on the extended first leg 130 and second leg 132. The angle formed between the first leg 130 (or second leg 132) and the beam 110 may be about 15 degrees to about 60 degrees. In some embodiments, the angle formed between the first leg 130 (or second leg 132) and the beam 110 may be about 45 degrees. When extended, the first leg 130 and second leg 132 are not parallel to each other. In some embodiments, when extended the first 130 and second leg 132 form an angle of between 10 degrees to about 110 degrees with respect to each other. In some embodiments, when extended the first 130 and second leg 132 form an angle of about 45 degrees with respect to each other.

In some embodiments, the beam further comprises a first keyboard support arm 140 pivotably attached to the second wedge surface 122, and a second keyboard support arm 142 pivotably attached to the fourth wedge surface 126. The first keyboard support arm 140 and second keyboard support arm 142 can be pivotably extended forward and a first keyboard 150 can be rested onto the first keyboard support arm 140 and the second keyboard support arm 142.

In some embodiments, the beam further comprises a first carve out 160 disposed on the front beam side 112, wherein a light stick 170 is pivotably attached within the first carve out 160. In some embodiments, the light stick 170 is disposed above the first and second keyboard support arms 140/142 such that the light stick can shine light onto the keyboard and/or a music stand disposed above the first and second support arms 140/142. In some embodiments, the light stick is operatively connected to a power source. In some embodiments, the light stick can be extended telescopically.

In some embodiments, the beam further comprises a second carve out 180 disposed on the front beam side 112, wherein a handle is fixably disposed within the second carve out 180.

In some embodiment, the beam 110 further comprises a first storage compartment 190 disposed at the top bean end 115. In some embodiments, the beam 110 further comprises a second storage compartment 200 disposed at the lower beam end 116. In some embodiments, the beam 110 further comprises a power strip 210 (or surge protector) disposed on the beam.

In some embodiments, the beam 110 further comprises a third keyboard support arm 144 pivotably attached to the second wedge surface 122, and a fourth keyboard support arm 146 pivotably attached to the fourth wedge surface 126, wherein the third keyboard support arm 144 and fourth keyboard support arm 146 can be pivotably extended forward and a second keyboard 152 can be rested onto the third keyboard support arm 144 and the fourth keyboard support arm 146.

As used herein, the term "about" refers to plus or minus 10% of the referenced number.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A keyboard instrument stand 100 comprising:
   (a) a beam 110 having a front beam side 111, a back beam side 112, a first beam side 113 and a second beam side 114, a top beam end 115 and a lower beam end 116, wherein the first beam side 113 is concave toward a center 117 of the beam 110 to form a first wedge surface 120 and a second wedge surface 122, and the second beam side 114 is concave toward the center 117 of the beam to form a third wedge surface 124 and a fourth wedge surface 126;

(b) a first leg 130 pivotably attached to the first wedge surface 120, and a second leg 132 pivotably attached to the third wedge surface 124, wherein the first leg 130 and the second leg 132 can be pivotably extended backward and the beam can stably lean on the extended first leg 130 and second leg 132;

(c) a first keyboard support arm 140 pivotably attached to the second wedge surface 122, and a second keyboard support arm 142 pivotably attached to the fourth wedge surface 126, wherein the first keyboard support arm 140 and second keyboard support arm 142 can be pivotably extended forward and a first keyboard 150 can be rested onto the first keyboard support arm 140 and the second keyboard support arm 142;

(d) a first carve out 160 disposed on the front beam side 112, wherein a light stick 170 is pivotably attached within the first carve out 160; and (e) a second carve out 180 disposed on the front beam side 112, wherein a handle 182 is fixably disposed within the second carve out 180.

2. The stand of claim 1 wherein a first storage compartment 190 is disposed at the top beam end 115.

3. The stand of claim 1 wherein a second storage compartment 200 is disposed at the lower beam end 116.

4. The stand of claim 1 wherein a power strip 210 is disposed on the beam.

5. The stand of claim 1 wherein a third keyboard support arm 144 pivotably attached to the second wedge surface 122, and a fourth keyboard support arm 146 pivotably attached to the fourth wedge surface 126, wherein the third keyboard support arm 144 and fourth keyboard support arm 146 can be pivotably extended forward and a second keyboard 152 can be rested onto the third keyboard support arm 144 and the fourth keyboard support arm 146.

* * * * *